Feb. 8, 1949. F. J. WOLFF, JR 2,461,190
ADJUSTABLE MOUNT FOR OPTICAL ELEMENTS
Filed Aug. 4, 1945

FREDERICK J. WOLFF, JR.
INVENTOR

BY Newton M. Perrins
Donald H. Stewart
ATTORNEYS

Patented Feb. 8, 1949

2,461,190

UNITED STATES PATENT OFFICE 2,461,190

ADJUSTABLE MOUNT FOR OPTICAL ELEMENTS

Frederick J. Wolff, Jr., Rochester, N. Y., assignor to Eastman Kodak Company, Rochester, N. Y., a corporation of New Jersey Application August 4, 1945, Serial No. 608,977

9 Claims. (Cl. 248—180)

This invention relates to adjustable mounts for optical elements and particularly to mounts which are primarily intended for factory adjustments. One object of my invention is to provide a mount which will permit fine angular adjustments. Another object of my invention is to provide a mount of comparatively small size which can readily be placed in various-known types of optical instruments. Another object of my invention is to provide a mount in which the optical element is so carried that no strains will be transferred to the optical element during the adjustments. Other objects will appear from the following specification, the novel features being particularly pointed out in the claims at the end thereof.

It is well known that optical elements such as mirrors, prisms, lenses, and the like, must be very carefully mounted so that these optical elements may be adjusted to, and may remain in, the exact position required. One difficulty in mounting such optical elements, and particularly in mounting relatively thin optical elements such as mirrors, is that the optical element can be very readily distorted even after it is mounted in its support in adjusting the support to its final position. Thus, in mirrors, comparatively slight pressure can sometimes distort a mirror, changing its reflecting surface from the desirable plane to a curve which will render the instrument defective. I have particularly designed an adjustable mount for optical elements in which that portion of the mount which holds the element is so arranged that it is difficult, if not impossible, to distort it in adjusting the mount.

Coming now to the drawings wherein like reference characters denote like parts throughout:

Figure 1:
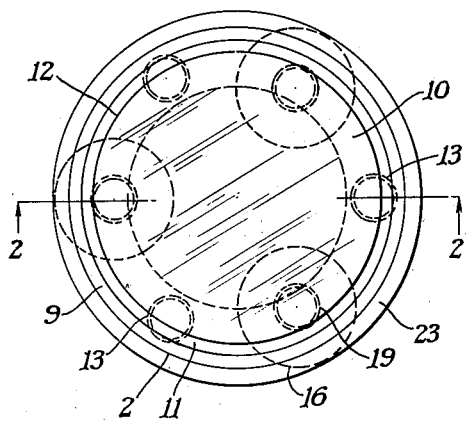
Fig. 1 is a top plan view of an adjustable mount for optical elements constructed in accordance with and embodying a preferred form of my invention.
Figure 2:
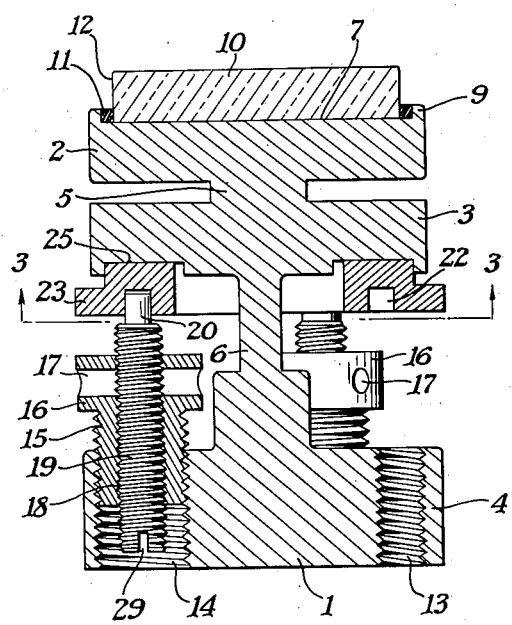
Fig. 2 is a longitudinal section taken on line 2—2 of Fig. 1.
Figure 3:
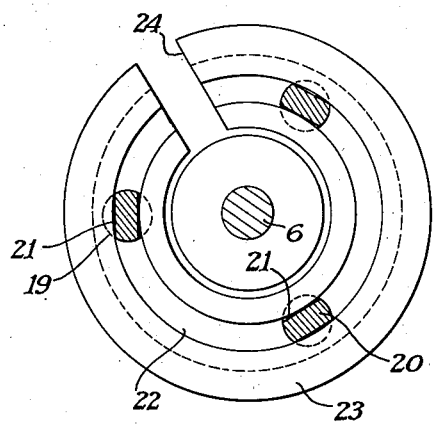
Fig. 3 is a transverse section taken on line 3—3 of Fig. 2.

My invention consists broadly in providing a mount for optical elements which is compact and which includes a narrow neck connecting portions of the support, this neck being made of material capable of bending. The narrow neck may be flexible, if desired, although I prefer to form this neck of a material which flexes with some difficulty. I also prefer to mount the optical element itself on a section of the mount which is protected against strain by a comparatively narrow neck so positioned that the strain of bending the bendable neck will not be transmitted to the surface carrying the optical element.

More specifically, a typical example of my mount may consist of a support 1 which preferably is formed in three sections—a top section 2, a middle section 3, and a base section 4. The top section 2 is connected to the middle section 3 by means of a neck 5 of much smaller cross-section than the cross-section of the entire support 1, and the middle section 3 and the base section 4 are connected by a neck 6 which is capable of being bent. The neck 6 is preferably of considerably smaller cross-section than the neck 5, and the neck 6 is preferably slightly resilient but, in any event, whether it is resilient or not, it can be bent to alter the relationship between the top and middle sections 2 and 3 and the base section 4. The top section 2 in the present instance is provided with a seat 7 which may lie in a plane surrounded with an upstanding flange 9 extending around the periphery. This seat is designed to receive an optical mirror 10 such as are usually made of glass. This mirror 10 may be held in place by cement 11 extending between the flange 9 and the periphery 12 of the mirror, or, if desired, a layer of cement may extend completely beneath the mirror 10 between the seat 7 and the mirror.

It is obvious that instead of a mirror, a prism, lens, or any other optical element could be mounted in the seat 7 which, of course, is designed to receive the particular type of optical element that it is to carry.

Figure 4:
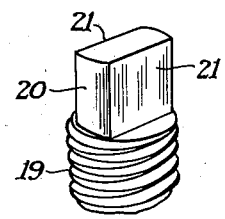
Fig. 4 is an enlarged fragmentary detail showing the end of an adjusting screw.

The base section 4 may be secured to any instrument to carry the optical element by suitable screws entering the threaded openings 13 in the base section. The base section is likewise provided with a plurality of threaded openings 14 (here shown as 3), each of these openings being adapted to threadedly support a hollow screw 15. This screw is provided with a head 16 provided with openings 17 by which the screw may be turned. The screw 15 is provided with an interior thread 18 supporting a second screw 19, this screw, in turn, having an upwardly-extending tongue 20 formed, as shown in Fig. 4, with two flats 21 on opposite sides. These flats are designed to engage in a groove 22 formed in the ring-shaped bearing member 23 which may, if desired, be slotted at 24 to facilitate placing the flats 21 in position. The annular member 23 may rest in an annular recess 25 formed in the bottom side of the middle section 3, thus forming a pressure surface against which the screw-adjusting members may press when one or both of the members forming each screw-adjusting member are turned.

The screw 19 is provided with a screw slot 29 by which the screw may be turned, but since the flats 21 on the end of the screw engage the groove 22, this screw cannot normally be turned except when these interengaging parts are disengaged. Thus, it is customary to set up the instrument and adjust the position of the mirror 10 by turning the hollow screws 15 by means of a tool fitting into the apertures 17 and when this is done, the neck 6, between the support sections 3 and 4, is bent or flexed. However, the strain against the pressure surface 24 of section 3 is not transmitted to the section 2 of the support because of the relatively narrow neck 5.

My adjustment is chiefly designed for moving the optical element only a comparatively small distance and this can usually be done by adjusting the three screws. I prefer to provide a pitch on the thread of the hollow screw engaging the thread 14 somewhat coarser than the pitch of the thread 18 on the screw 19. To make continuous adjustment possible, a number of turns, T, over which the differential nut is operative must satisfy the expression $$T \geq \frac{n}{2(n'-n)}$$

Then if full motion of any adjusting member is insufficient to obtain the proper setting, it is only necessary to relieve the pressure on all three adjusting screw members and rotate the ring 23 to bring its slot 24 above the offending screw, then rotate the screw one-half turn in the proper direction and again engage the slot 22 with the flats 21 thereof, after which the adjustment can proceed.

In practice, it is usually best in the final setting to have all three screws under compression, thus insuring good angular stability. In such a case it is not highly important whether the neck 6 is sufficiently flexible to return to its initial position when pressure is released on the screws, or whether the neck 6 is actually bent by the pressure applied to the screws. This adjustment is usually made in the factory although, of course, it can be changed at any time. One of the important features of my invention is that the top section 2 is relatively free from strains since the narrow neck 5 more or less insulates the section 2 against the stresses and strains applied to the middle section 3.

It should also be noticed that this optical mount can be made comparatively small since, in the form illustrated, it is only slightly larger in diameter than the diameter of the mirror 10. Obviously, the specific form and shape of the mount will be varied to suit the particular optical element being mounted. I consider as within the scope of my invention all such modifications as may come within the scope of the appended claims.

I claim:

1. An adjustable mount for optical elements comprising a support, a pressure surface, an optical element holding surface on the support, a first bendable neck forming the sole connection between said holding surface and said pressure surface included in the support, a base carried by the support spaced from the pressure surface and connected thereto by a second bendable neck, said second bendable neck bending more readily than said first bendable neck, and means extending between the base and pressure surface for bending the second bendable neck and for holding the second bendable neck in a predetermined position, said first bendable neck preventing distortion of the optical element holding surface when the bendable neck is bent.

2. An adjustable mount for optical elements as defined in claim 1 in which the support, the first bendable neck and the second bendable neck are all formed of a single piece of metal.

3. An adjustable mount for optical elements as defined in claim 1 in which the means for bending the second bendable neck are a plurality of screws extending between two parts of the support, the base and pressure surface, each screw being threaded to one part and bearing against the other part.

4. An adjustable mount for optical elements as defined in claim 1 in which the means for bending the second bendable neck are a plurality of screws extending between two parts of the support, the base and pressure surface, each screw comprising an inner screw bearing against one part, and threadedly connected to a hollow screw, the hollow screw being threadedly connected to the other part whereby one or both threaded connections may be used to position the optical element.

5. An adjustable mount for optical elements as defined in claim 1 in which the means for bending the second bendable neck are a plurality of screws extending between two parts of the support, the base and pressure surface, an annular member lying against the pressure surface and having a groove therein, each screw having a tongue lying in the groove, and a hollow screw threaded to the support and to each screw for varying the distance between the base and pressure surface.

6. An adjustable mount for optical elements comprising a support having a top, middle and base section, a first bendable neck extending between the top and middle sections and being the sole connection therebetween, a second bendable neck extending between the middle section and the base section, a slotted ring lying against the middle sections with the slot facing the base section, screws having flanges engaging the slot extending downwardly towards the base section, hollow screws threadedly attached to said screws and to the base, said top section being adapted to support an optical element, said screws and hollow screws being movable to vary the relationship between the middle section and the base section by bending the second bendable neck but not the first bendable neck whereby the top section is free from strain.

7. An adjustable mount for optical elements as defined in claim 6 characterized by means included in the screws and hollow screws threadedly attached thereto for varying the relationship between the base and middle sections of the support.

8. An adjustable mount for optical elements as defined in claim 6 characterized by means included in the screws and hollow screws threadedly attached thereto for varying the relationship between the base and middle sections of the support, said means comprising a slot in the screw and a plurality of radially-extending apertures in the hollow screw.

9. An adjustable mount for optical elements as defined in claim 1 in which the means for bending the second bendable neck are a plurality of screws extending between two parts of the support, the base and pressure surface, an annular member lying against the pressure surface and having a groove therein, each screw having a tongue lying in said groove, the annular groove member including a radially extending slot of a width greater than the screw tongue whereby a screw tongue may be moved to, and lie idly in, said radial groove.

FREDERICK J. WOLFF, JR.

REFERENCES CITED

The following references are of record in the file of this patent:

UNITED STATES PATENTS

| Number | Name | Date |
| --- | --- | --- |
| 1,491,075 | Batchelor | Apr. 22, 1924 |
| 2,276,945 | Ehrich | Mar. 17, 1942 |

OTHER REFERENCES

Optical Workshop Principles, by Deve, p. 266, a copy of which is in Div. 58 of the Patent Office.